United States Patent Office

3,642,628
Patented Feb. 15, 1972

3,642,628
INSOLUBLE ORGANOTIN SALT STABILIZERS FOR ACRYLONITRILE POLYMERS
George Palethorpe, 44–C Colonial Apts., Durham, N.C. 27707
No Drawing. Filed Dec. 30, 1968, Ser. No. 788,104
Int. Cl. C08f 45/62
U.S. Cl. 260—45.75 K    7 Claims

ABSTRACT OF THE DISCLOSURE

Insoluble organotin salts of organic and inorganic oxygen-containing acids are effective stabilizers against color initiated by heat and light in halogen-containing acrylonitrile polymer fibers. Unlike the soluble tin compounds, the insoluble organotin salts are well-retained within these fibers when they are produced by wet spinning techniques.

BACKGROUND OF THE INVENTION

(1) Field of the invention

This invention is in the field of synthetic fibers and more particularly acrylonitrile polymer fibers and their stabilization against heat and light degradation by the use of certain insoluble organotin compounds.

(2) Description of the prior art

Fibers of synthetic, linear polymers are well known in the art, and their general utility is recognized from their wide acceptance in a variety of end uses in the fiber and textile field. However well received, all fibers have deficiencies the removal of which would be expected to still further increase usage. One such deficiency common to most synthetic fibers to varying degrees and especially to those containing halogen is degradation upon exposure to heat and light, resulting in the development of objectionable color in the fibers. Many agents are known in the art which when incorporated into the fiber during the spinning operation reduce this degradation. However, most of these stabilizing agents merely reduce the extent of initial degradation during spinning and processing instead of continuing to protect against discoloration during extended wear of use. In addition, fibers containing many of the known effective stabilizing agents are unsatisfactory when very light pastel colors are required since the agents themselves impart an initial color to the fibers. Most of the synthetic linear acrylonitrile polymer fibers acquire during their production a slight yellowish cast of color which is objectionable to the textile industry. Most of this is due to contact with elevated temperatures during or immediately subsequent to the spinning operation. Another method for achieving a satisfactory initial fiber color is bleaching with known textile bleaching agents. However, although these conventional bleaching methods remove initial discoloration, most bleached synthetic fibers are not stable to ultraviolet light and generally become discolored after several hours exposure to light. Yet these same synthetic fibers possess a very desirable spectrum of textile properties including pleasing hand, good wear resistance, high resilience, good shape retention, and a high level of body or bulk.

Organotin compounds are well known in the art for the stabilization of vinyl chloride and vinylidene chloride polymers. Yngve teaches in U.S. 2,267,777 the stabilization against coloration by heat or light of vinyl chloride/vinyl acetate copolymers by the incorporation therein of organotin and organolead compounds such as triphenyltin hydroxide and dibutyltin oxide. These stabilizers are incorporated in the resin mass and intimately dispersed therethru by milling on a heated two roll mill. In U.S. 2,307,092 Yngve teaches the thermal stabilization of a halogen-containing vinyl resin by the intimate incorporation therein of an organotin salt of a carboxylic acid, while in a coeval patent, U.S. 2,307,157, Quattlebaum, Jr. et al. teaches the use of organotin salt of $\alpha,\beta$-olefinic unsaturated carboxylic acids, including those of such dicarboxylic acids as maleic and itaconic acids.

Carrol in U.S. 2,597,910 teaches the heat and light stabilization of vinyl chloride- and vinylidene chloride-containing resins by the incorporation of the liquid reaction product of an organotin oxide and an ester of an oxygen-containing acid having at least one oxygen atom in an acid radical attached to a replaceable acidic hydrogen atom.

Although effective color stabilizers of vinyl halide-containing resins, the organotin salts of carboxylic acids have been recognized as frequently being exuded by the resinous structures incorporating them in stabilizing amounts (See U.S. 2,830,067). Another detriment to the use of these salts in wet spun fibers is the severe leaching of these materials from the fibers during the coagulation step. This is especially true of acrylic fibers which must be dissolved in the so-called "super solvents" such as dimethylformamide or dimethylsulfoxide.

Veasey et al. in U.S. 3,313,768 teaches the stabilization of halogen-containing acrylonitrile fibers by the incorporation into the polymer spinning solution of oxalic acid and dibutyltin oxide. The molar ratio of oxalic acid to dibutylin oxide is shown to be at least 2.7 to 1 and as high as 4.1 to 1.

This invention provides organotin salt color stabilizers which are insoluble in acrylonitrile polymer solvents and may be added to the polymer spinning solution assuring a high degree of retention of the stabilizer in the resulting fiber.

SUMMARY OF THE INVENTION

This invention relates to the use of solid, insoluble organotin salts of oxygen-containing acids having at least two replaceable acid hydrogen atoms each attached to separate oxygen atoms in stabilizing halogen-containing acrylonitrile polymer fibers spun by wet spinning techniques against degradation and discoloration caused by heat and light. These salts are well retained within the fibers throughout the spinning operation and are not exuded in subsequent use.

PREFERRED EMBODIMENTS

This application is generally directed to the stabilization against heat and light-induced color formation in halogen-containing acrylonitrile polymer fibers. Included within the classes of fibers stabilized by the teaching of this invention are fibers composed of copolymer, terpolymers, interpolymers and blends of acrylonitrile polymers.

The halogen content of these fibers may arise from the copolymerization of halogen-containing mono-olefinically unsaturated monomers such as vinyl bromide and vinylidene chloride into the fiber-forming polymer chain, or it may be incorporated in a polymeric or non-polymeric additive such as polyvinyl chloride or tribromopropylphosphate.

The fiber-forming acrylonitrile polymers useful in this invention may and generally do contain halogen-free mono-olefinic comonomers such as vinyl acetate or methyl acrylate which contribute significantly to improve physical properties, dyeability, etc.

In general, the polymers which are useful in the practice of the invention contain greater than 35 percent acrylonitrile and preferably contain greater than 80 percent acrylonitrile and up to 20 percent of one or more copolymerizable mono-olefinic monomers at least one of which must be a halogen-containing monomer.

Suitable copolymerizable mono-olefinic monomers include acrylic, alpha-chloroacrylic and methacrylic acids, the methacrylates, such as methyl methacrylate, ethyl methacrylate, butyl methacrylate, methoxymethyl methacrylate, beta-chloroethyl methacrylate, and the corresponding esters of acrylic and alpha-chloroacrylic acids; vinyl chloride, vinyl fluoride, vinylidene chloride, 1-chloro-1-bromoethylene, methacrylonitrile, acrylamide and methacrylamide; alpha-chloroacrylamide, or mono-alkyl substitution products thereof; methyl vinyl ketone; vinyl carboxylates, such as vinyl acetate, vinyl chloroacetate, vinyl propionate, and vinyl stearate; N-vinylimides, such as N-vinylphthalimide and N-vinylsuccinimide; methylene malonic esters; itaconic acid and intaconic esters; N-vinylcarbazole; vinyl furan; alkyl vinyl ethers; vinyl sulfonic acids, such as vinyl sulfonic acid, styrene sulfonic acid, methallyl sulfonic acid, p-methallyloxy benzene sulfonic acid and their salts; ethylene alpha, beta-dicarboxylic acids or their anhydrides or derivatives, such as diethyl citraconate, diethyl mesaconate; styrene; vinylnaphthalene; vinyl-substituted tertiary heterocyclic amines such as the vinylpyridines and alkyl-substituted vinylpyridines for example, 2-vinylpyridine, 4-vinylpyridine, 2-methyl-5-vinylpyridine, and the like; 1-vinylimidazole and alkyl-substituted 1-vinylimidazoles, such as 2-, 4-, or 5-methyl-1-vinylimidazole, vinyl-pyrrolidone, vinylpiperidone, and other mono-olefinic copolymerizable monomeric materials.

The halogen-containing acrylonitrile fibers stabilized according to the teachings of this invention may be produced by any of the well-known solution spinning techniques, i.e., by dry, wet, or dry jet/wet spinning techniques. Dry spinning is described in U.S. 2,636,217; wet spinning is described in U.S. 2,920,934; dry jet/wet spinning (DJ/WS) is described in U.S. 3,080,210. This invention is especially preferable in the cases of wet spinning and DJ/WS due to the excessive leaching of the conventional, soluble additives into the coagulation bath usually encountered in these systems.

It should be obvious that the insoluble organotin salt stabilizers of this invention are equally applicable to the self-crimping bicomponent or composite fibers as well as the more common monocomponent fibers so long as the polymer compositions of the fibers remain within the purview of this invention.

While the preferred polymer solvents are the so-called "super solvents" such as dimethylformamide, dimethylacetamide, dimethylsulfoxide, etc., other suitable solvents may be employed. For example, concentrated aqueous solutions of zinc chloride or calcium thiocyanate may also be used in the spinning of acrylonitrile polymer fibers while less powerful solvents such as acetone and acetonitrile may be used in the spinning of low acrylonitrile content fibers. Since the stabilizers of this invention are substantially insoluble in the polymer solvents used, they must be very finely ground in any suitable manner to such a degree that the individual stabilizer particles will readily pass thru the filter media normally used to remove undesirable particulate material from the polymer solutions prior to spinning. The stabilizers, suspended in a small amount of the polymer solvent, may be ground satisfactorily in a Vertis homogenizer or other suitable mixer or mill. Delusterants may be added to the spinning solution, if desired, to give the resulting fibers a dull appearance.

Apart from the addition of the finely ground, insoluble dibutyltin salts to the polymer spinning solutions, standard spinning and fiber processing techniques may be used. And, since leaching of stabilizer from the freshly coagulated fiber into the coagulation bath is minimized, solvent recovery problems are lessened as compared with stabilization by a soluble dibutyltin salt such as dibutyltin succinate.

The insoluble, organotin salt stabilizers of this invention effectively stabilize acrylonitrile polymer fibers against heat and light degradation when incorporated in the spinning solution in amounts of from about 0.05 to 2.5 percent based on the weight of polymer. While these stabilizers are not substantially leached into the coagulation bath from the fibers during spinning, the insoluble organotin salts may be retained to a small extent on the spinnerette filter, especially if not sufficiently ground prior to addition. Thus, effective stabilizing amounts of these stabilizers based on the weight of polymer in the fibers may be from about 0.025 to 2.5 percent.

The insoluble organotin salts of this invention consist of dialkyl and diaryl tin salts of organic and inorganic oxygen-containing acids having at least two replaceable acid hydrogen atoms each attached to separate oxygen atoms.

Suitable dialkyl and diaryl tin compounds which may be used in preparing the salts of the invention include dialkyl and diaryl tin diesters such as dimethyltindiformate diethyltindiformate, dimethyltindiacetate, diethyltindiacetate, dipropyltindiacetate, dibutyltindiacetate, dihexyltindiacetate, dioctyltindiacetate, dimethyltindipropionate, diethyltindipropionate, dibutyltindipropionate, diphenyltindiacetate, diphenyltindipropionate and the like.

Useful oxygen-containing acids which form the insoluble organotin salt include organic acids such as oxalic, terephthalic and isophthalic acid. Inorganic acids which may be used include boric, sulfuric, orthophosphoric, selenic and ortho-telluric acid. It has been found that other common aliphatic, saturated and unsaturated dicarboxylic acids apparently do not form salts that are substantially insoluble in acrylonitrile polymer solvents.

The insoluble organotin salt stabilizers of this invention may be readily prepared in a very pure state by the reaction of, for example, dialkyltin diacetate (or diaryltin or alkaryltin diacetate) with a difunctional, oxygen-containing acid of choice in a suitable medium. For example, in the preparation of dibutyltin oxalate or sulfate, dibutyltin oxide is added to a large excess of glacial acetic acid. The resulting solution is treated with activated charcoal and filtered. A stoichiometric quantity of the acid is dissolved in an excess of glacial acetic acid. This solution is then added with stirring to the solution of dibutyltin diacetate, giving a white precipitate which is then filtered, washed with acetic acid, then with methanol or acetone, and dried. A similar procedure is followed in the preparation of dibutyltin terephthalate except that dimethylformamide is used as the reaction medium instead of acetic acid due to solubility limitations of terephthalic acid.

The following examples illustrate the invention and should not be considered to be limiting in any way. The percentages of spinning solution additives are based on the weight of polymer in the solution. In the color measurements of the examples, the dominant wave length of all samples was $575\pm3$ m$\mu$. Reported specific viscosities were measured in dimethylformamide at 25° C. and a concentration of 0.1 g. of polymer in 100 ml. of solution.

Example 1.—A polymer comprising about 86.5 percent acrylonitrile (AN), 8.5 percent methyl acrylate (MA), 4.3 percent vinylidene chloride (VCl$_2$), and 0.7 percent sodium p-sulfophenylmethallyl ether and having a specific viscosity of about 0.15 was spun into acrylic fibers using a coagulation bath comprising 60% dimethylacetamide and 40% water at 30° C., washing and a 3.5× stretch. One sample, the control, was spun with no stabilizer; the other contained 1 percent of finely ground dibutyltin oxalate (DBTOx) added to the spinning solution prior to spinning. Except for the presence of DBTOx in one, both samples were spun under substantially identical conditions. Fiber color measurements were made on both as-spun samples using a G.E. spectrophotometer. Samples of each fiber were then heated at 145° C. for 25 minutes, and the fiber color measurements were again made.

|  | Initial purity | Heated purity | Initial brightness | Heated brightness |
|---|---|---|---|---|
| Control | 12.7 | 15.4 | 77.3 | 69.6 |
| With DBTOx | 6.4 | 12.7 | 87.1 | 74.6 |

Both initial and heated color show marked improvement when DBTOx is incorporated in the fiber.

Example 2.—Fibers were spun using the spinning procedure of Example 1 from a polymer comprising about 72 percent acrylonitrile, 17 percent vinyl bromide, 10 percent methyl acrylate, and 1 percent itaconic acid and having a specific viscosity of 0.14. Two fiber samples were prepared, one containing 0.5 percent of DBTOx and a second containing no stabilizer. Heat stabilities were measured as n Example 1, again demonstrating the stablizing effect of DBTOx.

|  | Initial purity | Heated purity | Initial brightness | Heated brightness |
|---|---|---|---|---|
| Control | 6.7 | 17.0 | 88.0 | 74.0 |
| With DBTOx | 5.4 | 13.4 | 89.8 | 79.8 |

Example 3.—A polymer blend was prepared of 50 percent of polymer A which comprised about 88 percent acrylonitrile, 7 percent vinyl acetate, and 5 percent vinyl bromide and 50 percent of polymer B which contained 93 percent acrylonitrile and 7 percent vinyl acetate. Both polymers had specific viscosities of about 0.15. Acrylic fibers were spun from this blend using the wet spinning technque of Example 1. Both fiber samples contained 2 percent antimony oxide; the control contained no other additives. The test fiber contained 0.25 percent of DBTOx. Color measurements were made on both fiber samples as in Example 1 before and after heat treatment and are tabulated.

|  | Initial purity | Heated purity | Initial brightness | Heated brightness |
|---|---|---|---|---|
| Control | 9.6 | 14.0 | 81.7 | 75.0 |
| DBTOx | 9.2 | 13.1 | 82.0 | 79.8 |

Example 4.—Fibers were spun by the conventional wet spinning technique of Example 1 from a polymer comprising about 76 percent acrylonitrile, 8 percent vinyl acetate, and 16 percent vinyl bromide and having a specific viscosity of about 0.14. Three fiber samples were prepared: a control containing no additive, a sample containing 0.5 percent DBTOx, and a sample containing 0.5 percent dioctyltin oxalate (DOTOx). Color values as measured in Example 1 are tabulated.

|  | Initial purity | Heated purity | Initial brightness | Heated brightnes |
|---|---|---|---|---|
| Control | 9.7 | 19.3 | 83.6 | 68.2 |
| DBTOx | 8.4 | 17.1 | 86.3 | 71.2 |
| DOTOx | 9.1 | 16.0 | 85.6 | 73.5 |

Example 5.—Using the conventional wet spinning technique of Example 1 fibers were spun from a polymer comprising about 90 percent acrylonitrile, 7 percent vinyl acetate, and 3 percent vinyl bromide and having a specific viscosity of about 0.15. Control fibers contained no additive. Two stabilized fiber samples were prepared, one containing 0.5 percent of DBTOx and the other containing 0.5 percent of dibutyltin sulfate (DBTSO₄). Color values as measured in Example 1 are tabulated.

|  | Initial purity | Heated purity | Initial brightness | Heated brightnes |
|---|---|---|---|---|
| Control | 8.7 | 13.2 | 84.9 | 80.0 |
| DBTOx | 7.3 | 12.4 | 86.9 | 82.0 |
| DBTSO₄ | 7.2 | 11.0 | 87.8 | 84.0 |

Example 6.—Fibers were spun as per Example 1 from a polymer comprising about 67 percent acrylonitrile, 20 percent vinylidene chloride, 10 percent vinyl bromide, 2 percent itaconic acid, and 1 percent styrene and having a specific viscosity of about 0.15. In addition to a control containing no additive three stabilized fibers were spun, one containing DBTOx, one containing DBTSO₄, and one containing dibutyltin terephthalate (DBTT). Color values as measured in Example 1 are tabulated.

|  | Initial purity | Heated purity | Initial brightness | Heated brightness |
|---|---|---|---|---|
| Control | 9.4 | 20.5 | 81.2 | 70.9 |
| DBTOx | 8.8 | 19.7 | 83.7 | 72.2 |
| DBTSO⁴ | 9.7 | 19.8 | 82.9 | 70.1 |
| DBTT | 9.2 | 19.3 | 79.0 | 71.4 |

Thus, even in these modacrylic fibers containing relatively high levels of halogen moderate improvements in initial and/or heated color are achieved by the addition of an insoluble dibutyltin salt.

Example 7.—Saturated solutions of each of the compounds dibutyltin oxalate (DBTOx), dibutyltin sulfate (DBTSO₄), and dibutyltin terephthalate (DBTT) were prepared by stirring for several hours suspensions of about 0.5 g. of each of the compounds in 50 ml. samples of dimethylacetamide (DMAc) heated at 65–70° C. and then filtering hot. The filtrates were then analyzed for tin.

| Compound: | Solubility in DMAc (g./100 ml.) |
|---|---|
| DBTOx | 0.05 |
| DBTSO₄ | 0.25 |
| DBTT | 0.03 |

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the present invention is intended to be included within the scope of the claims.

I claim:

1. A composition of matter comprising an acrylonitrile polymer characterized as composed of acrylonitrile and one or more other mono-olefinic monomers at least one of which is halogen-containing, the acrylonitrile constituting at least 35 percent and the olefinic monomer up to 65 percent, each based on the weight of the polymer and from 0.5 to 2.5 percent based on the weight of the polymer of a dialkyl or diaryl tin salt of an acid selected from the group consisting of oxalic, terephthalic, isophthalic, sulfuric, orthophosphoric, selenic and ortho-teluric acids.

2. The composition of matter of claim 2 wherein the polymer is a copolymer comprising at least 80 percent acrylonitrile, based on the weight of the polymer, and up to 20 percent, based on the weight of the polymer, of the mono-olefin monomer.

3. The composition of matter of claim 1 wherein the salt is dibutyltin oxalate.

4. The composition of matter of claim 1 wherein the salt is dioctyltin oxalate.

5. The composition of matter of claim 1 wherein the salt is dibutyltin sulfate.

6. The composition of matter of claim 1 wherein the salt is dibutyltin terephthalate.

7. The composition of matter of claim 1 in the form of a fiber.

References Cited

UNITED STATES PATENTS 2,867,641  1/1959  Ramsden _____ 260—429.7
3,055,861  9/1962  Hersh _____ 260—45.7

OTHER REFERENCES

J. Am. Chem. Soc. 75, pp. 3099–3101 (1953), article by Rochow et al.

J. Am. Chem. Soc. 80, pp. 4102–4 (1958), article by Andrews et al.

DONALD E. CZAJA, Primary Examiner

V. P. HOKE, Assistant Examiner

UNITED STATES PATENT OFFICE
CERTIFICATE OF CORRECTION

Patent No. 3,642,628     Dated February 15, 1972

Inventor(s) George Palethorpe

It is certified that error appears in the above-identified patent and that said Letters Patent are hereby corrected as shown below:

In the heading to the printed specification, between lines 5 and 6 should appear -- Assignor to Monsanto Company, St. Louis, Mo., a corporation of Delaware --; column 2, line 9, patent No. "2,597,910" should read -- 2,597,920 --.

Signed and sealed this 12th day of December 1972.

(SEAL)
Attest:

EDWARD M. FLETCHER, JR.
Attesting Officer

ROBERT GOTTSCHALK
Commissioner of Patents

FORM PO-1050 (10-69)